United States Patent [19]

Bischel et al.

[11] Patent Number: 5,113,488
[45] Date of Patent: May 12, 1992

[54] PAGE PRINTER COMPOSITION LINE SPACING REVISION

[75] Inventors: Patrick O. Bischel; John K. Brown, III; Carl P. Cole; Donald G. Fitch, all of Lexington, Ky.

[73] Assignee: Lexmark International, Inc., Greenwich, Conn.

[21] Appl. No.: 617,747

[22] Filed: Nov. 26, 1990

[51] Int. Cl.$^5$ .............................................. G06K 15/00
[52] U.S. Cl. ................................... 395/112; 395/102; 395/117
[58] Field of Search ............... 395/117, 102, 116, 112, 395/102; 346/154, 160, 107 R, 108; 358/451, 300

[56] References Cited

U.S. PATENT DOCUMENTS

| | | | |
|---|---|---|---|
| 4,046,471 | 9/1977 | Branham et al. | 346/160 |
| 5,045,967 | 9/1991 | Igorashi | 395/117 |

OTHER PUBLICATIONS

*IBM Technical Disclosure Bulletin* article entitled "Printer Algorithm for 1/a Step Size Using 1/b Physical Step and 1/c Element Spacing," vol. 31, No. 4, Sep. 1988 at pp. 360-364.

*IBM Technical Disclosure Bulletin* article entitled "Vertical Compensation Algorithm With Error Correction," vol. 28, No. 10, Mar. 1986 at pp. 4332-4336.

User's Manual of the Hewlett-Packard LaserJet IIP Printer, 1989, pp. 4-15 through 4-18.

Owner's Manual of the Hewlett-Packard DeskJet 500, 1990, pp. 5-9 and 5-10.

*Primary Examiner*—Arthur G. Evans
*Attorney, Agent, or Firm*—John A. Brady

[57] ABSTRACT

The bit map description for a page printer (1) from data for more lines per page than would normally fit on the page is composed by reserving the full vertical height of one line and determining the line spacing on the basis of the ratio (division) of the remaining printable page length to the number of lines less one. This is done automatically by a microprocessor (7) which determines the lines per page from the page selected from the control panel (13), performs the division (37) of lines per page less one into printable height less one, followed by page composition (39) based on the result. The data invariable fits into the mapped description without additional operator intervention.

16 Claims, 3 Drawing Sheets

PAGE PRINTER COMPOSITION LINE SPACING REVISION

DESCRIPTION

1. Technical Field

This invention relates to page printing in which text is defined by data assuming line and page endings and in which the data is used to create a mapped description of the page used by the printer. In such mapped descriptions the page area which can be printed on is divided into small regions arranged in contiguous rows and columns, and each region is treated as a unique picture element or pel. The mapped description has one instruction for each pel location, and the printer prints according to that instruction on the page at the corresponding location. In such a system the data may assume more lines for a page than the printer can apply to one page, and this invention is directed to that circumstance. A typical printer to which this invention relates is a laser printer.

2. Background of the Invention

In such a printer the mapped description is composed from the text data for an entire page. The mapped description is stored in electronic memory such that one instruction, typically one memory bit, defines a single laser operation for one pel location in the document. A certain number of pels corresponding to adjoining vertical and horizontal positions of printing are employed by each character or symbol in the data, which may be referred to as a character box. The characters and symbols are typically stored as font data for use each time the text data calls for individual characters or symbols. Font data is typically located in the center of a character box, so the typical character box has areas of no print or "white" around its borders.

Text data often does not specify the line separation, and the data is composed assuming the line separation to be a standard separation such as that for 6 lines per inch (approximately 2.36 lines per cm). The only other common line separation is that for 8 lines per inch (approximately 3.15 lines per cm). In composing an electronic description of the mapped page, ideally the first line is positioned with the top of the character boxes to be just at the top of the printable area of the page. The top of the character boxes for the next line is positioned below the top of the character boxes for the first line by a distance equal to the distance of the line separation, and this relationship is repeated for subsequent lines. Information in the character boxes does not overlap, since the line spacing is the same or larger than the height of the character box for 6 lines per inch printing. With such a character box arrangement, for 8 lines per inch line spacing, information in the character boxes does overlap and such overlap is common for 8 lines per inch printing.

Some data for a page, however, may define more lines on a page than can be accommodated by the printer. This can occur where inherent limitations of the printer prevent printing on the very top and bottom of a page, as is true for certain printers, since other printers do print at the very top and bottom. Data written assuming the top to bottom capability of the other printers may specify, two more lines than can be printed by printers which can not print the top and bottom lines. It is desirable to execute data prepared for such other printers on printers which have some limitation on the area on which they print.

A prior solution to printing from data calling for more lines on one page than the printer can normally execute is to revise the code to specify a shorter line spacing. So far as is known, the shorter spacing is determined manually by a person revising the code by dividing the printable page length by the number of lines to be on each page. Usually, the division would produce a remainder, which presumably would be ignored and the result would usually produce a fit on the printable area of the page. Where the previous line spacing was that for 6 lines per inch with the character box one-six inch in height, which is the same height as a 6 lines per inch line, the revised line spacing results in overlap of pel data from adjoining lines. In text such overlap is generally acceptable.

The solution of adding line code defining spacing to the text data is often impractical because the data is not amenable to change or the user is not capable of making the change. This may be due to the user not having the skill to effect the change or not having the necessary equipment.

A widely sold page printer responds in its primary or "native" mode to a data stream known as Printer Command Language. That language assumes top and bottom margins of three lines, which for standard, eleven inch (approximately 28 cm) letter paper leaves a printable region of 60 full lines when printing at 6 lines per inch. That printer provides for operator selection from its control panel of a line spacing which fits 66 lines into the 60 full line space. The resulting printing is overlapped, since the lines appear as though they had been moved slightly closer together.

Another prior solution has been to simply compose the data from text with the top two lines overlapped and the bottom two lines overlapped. This alerts the user of the text printed to the existence of all of the lines, but the lines involved may obscure the meaning of one another.

In accordance with this invention the electronic description of a page from data for more lines than would normally fit in the printable area of a page is composed by moving all of the lines closer together. In doing so the position of each line is computed and the pel data for adjoining lines are overlapped vertically. Computations similar in major respects to the computations of this invention, done to adjust line spacing are shown in the following two articles, and the computations are inherent in the foregoing solution of adding revised line spacing to the text data. However, none of these solutions are operable to assure repositioning of the data in every case without human intervention or test operations. The articles are the following: *IBM Technical Disclosure Bulletin* article entitled "Printer Algorithm for 1/a Step Size Using 1/b Physical Step and 1/c Element Spacing," Vol. 31, No. 4, Sep. 1988 at pp. 360-364 and *IBM Technical Disclosure Bulletin* article entitled "Vertical Compensation Algorithm with Error Correction," Vol. 28, No. 10 March 1986 at pp. 4332-4336.

DISCLOSURE OF THE INVENTION

In accordance with this invention the full vertical height of one line is reserved in the computations for determining line spacing, and the line spacing is determined on the basis of the ratio (division) of the remaining printable page length to the number of lines less one. This is automatically done under electronic control and is invariably successful in bringing all of the data to within the printable area. In a particular example, a character box is 50 pels in height, the 50 pels height being exactly that of a 6 lines per inch line interval. The printable page is 64 lines, which is 3200 pels. For data to be printed at 66 lines on a page, the computation is 3150 divided by 65, which is 48 with remainder of 30. The page map composition is on the basis of a 48 pels line spacing, with data from both of the overlapping parts of character boxes included in the map composed. (In the line spacing composition, remainders are included in subsequent line-by-line computations, so some of the lines are on a spacing of 49 pels, a refinement shown particularly in the 1986 article cited in the foregoing).

Accordingly, the automatic steps taken upon received data include: 1) determining the lines per page for the printing (which in the preferred embodiment is derived from the physical page size times the current default line spacing), 2) determining the page height available for printing (which in the preferred embodiment is a single, stored factor for each page size specified for printing), 3) obtaining a line spacing based on the available length for printing lines less one character box height divided by the lines per page in the text data less 1, and 4) composing a mapped description of the page with line spacing at least closely approximating the results of that division. Preferably, no pel data is discarded and the data is overlapped by retaining all pel data. Much the same effect would be achieved by not overlapping data since typically little data exists in the overlapping regions.

BRIEF DESCRIPTION OF THE DRAWING

The details of this invention will be described in connection with the accompanying drawing in which.

BEST MODE FOR CARRYING OUT THE INVENTION

Figure 1:
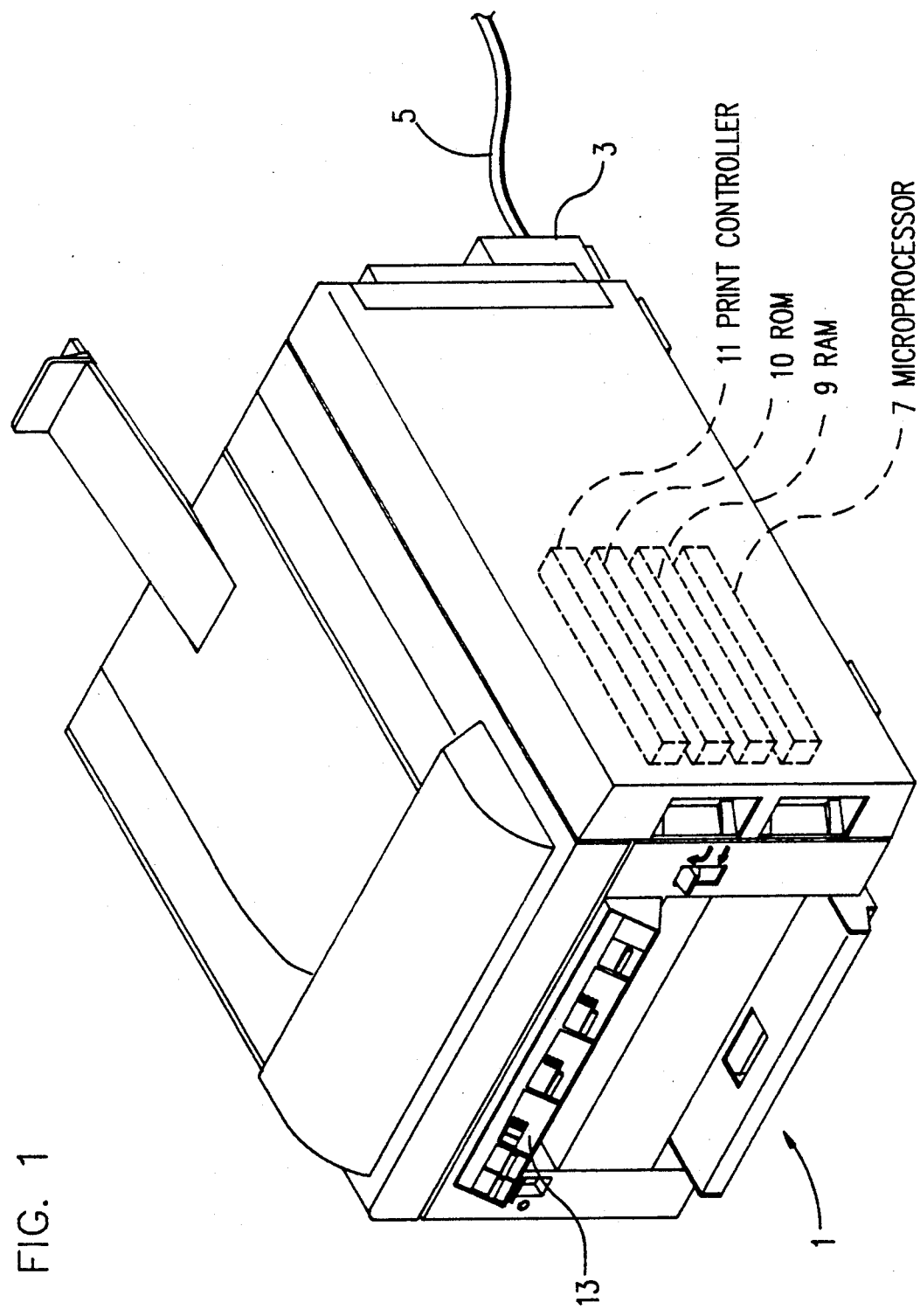
FIG. 1 is illustrative of a printer having bit mapped composition capabilities in accordance with this invention.

Referring to FIG. 1 a laser printer 1 receives print data at an input port 3 from a cable 5 connected to a host computer (not shown) as is conventional. The laser printer includes a microprocessor 7 which receives the print data to compose a bit map with one bit corresponding uniquely to each pel location of the printable area of a page to be printed. The microprocessor 7 stores the bit map in random access memory 9, shown illustratively as it is typically a part of a larger memory used with microprocessor 7. Permanent information accessed by the microprocessor 7, such as control instructions, are stored in read only memory 10. Printing is effected under the direction of the content of memory 9, by existing printing mechanisms shown illustratively as print controller 11. Printer 1 has a control panel 13 from which an operator may select various modes of operation of the printer, as well as other instructions, including the physical paper size to be printed upon.

For purposes of this invention an operator may select or deselect the line adjustment mode in accordance with this invention from panel 13. When the line adjustment mode is deselected, top and bottom lines are composed entirely over each other when the lines exceed the printable lines, as discussed in the foregoing or the lines per page are reduced and the extra lines are printed on subsequent pages.

Page sizes to be printed are entered on panel 13 as being one of six common full page sizes or one of six common envelope sizes, and orientation may also be entered. (Orientation describe whether printing is from top to bottom along the long axis, termed "portrait" or from top to bottom along the short axis, termed "landscape". When not entered, the default is portrait for full pages and landscape for envelopes.) When the line adjustment mode is selected, the number of lines on a page is derived from the physical height of the page size entered multiplied times the current default line spacing. For example, standard 11 inch long letter pages at six lines per inch results in 66 lines per page.

Figure 2:
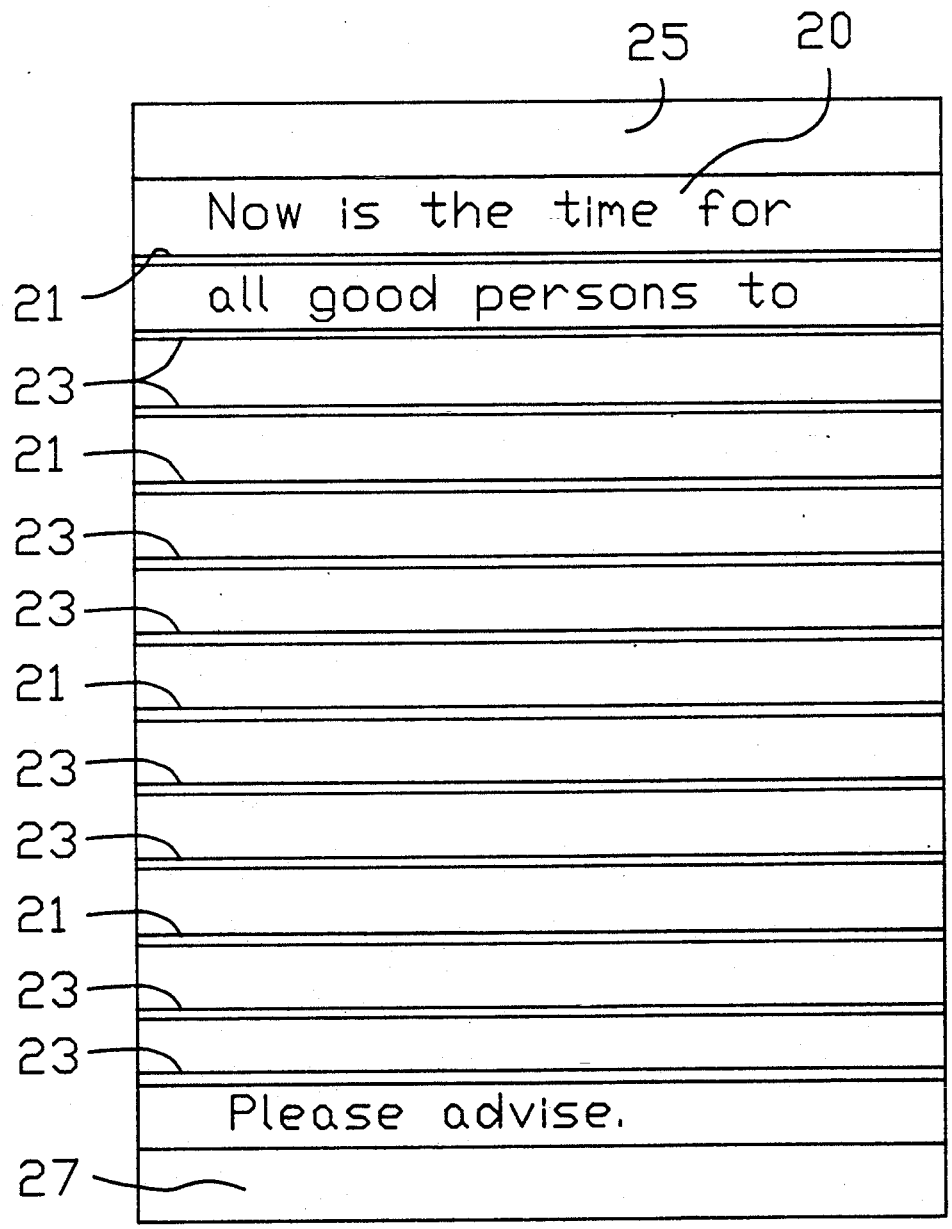
FIG. 2 is illustrative of a page having pel data positioned and overlapped in accordance with this invention.

FIG. 2 is illustrative of printing on a page in which the physical page is in portrait orientation and is 13 lines in height at 6 lines per inch. In the line adjustment mode printing will be at 13 lines per page. The printer is assumed to be the laser printer sold by the assignee of this invention as the 4019 LaserPrinter. The character box height is 50 pels and is invariable. The total printable page is two lines less than the 13 line physical height or 11 lines, which is 550 pels. The computation is 500 (550 minus 50) divided by 12 (the 13 lines per page minus 1), which yields 41 with remainder of 8. The line spacing from the top of printable area 20 is 41, 42 (since the remainder has totaled 16 and the divisor is 12, twelve are used in adding one pel and the new remainder is 4), 42 (with new remainder zero), 41 (with remainder of eight), 42 (with new remainder 4), 42 (with new remainder zero), and so on repetitively. The bottom line, the 13th line, is positioned by line spacing using the foregoing computations as a matter of mechanical convenience. (Alternatively, the last line could be simply positioned at the bottom of the printable area.) However, it is also possible to place the bottom line contiguous to the bottom line of the printable page without regard to the line spacing.

Overlapping regions 21 of lines shown in FIG. 2 by parallel lines have an overlap of 9 pels and regions 23 of lines have an overlap of 8 pels. The top region 25 is exactly the one line which the printer is incapable of printing on. The bottom region 27 is the one line which the printer is incapable of printing on plus whatever vertical offset the above described line computations produce for the bottom line of printing.

Illustrative text is shown in the top two lines and in the bottom line. Although the overlap brings the text in the subsequent line somewhat closer to the text in the preceding line, no overlap of black from the two lines is necessarily experienced. Normally, when the number of lines specified result in only a few pels of overlap, the text will be separated. Where the text does interfere, often it will only be for ascenders and descenders, such as the descender in the "g" of "good," which does not significantly obscure the overall text. This invention would not be used for either bit mapped graphics (termed all points addressable) or for graphics which is assembled by printing graphics symbols, since graphics symbols often do have important portions which extend to the top and bottom of the character box.

Figure 3:
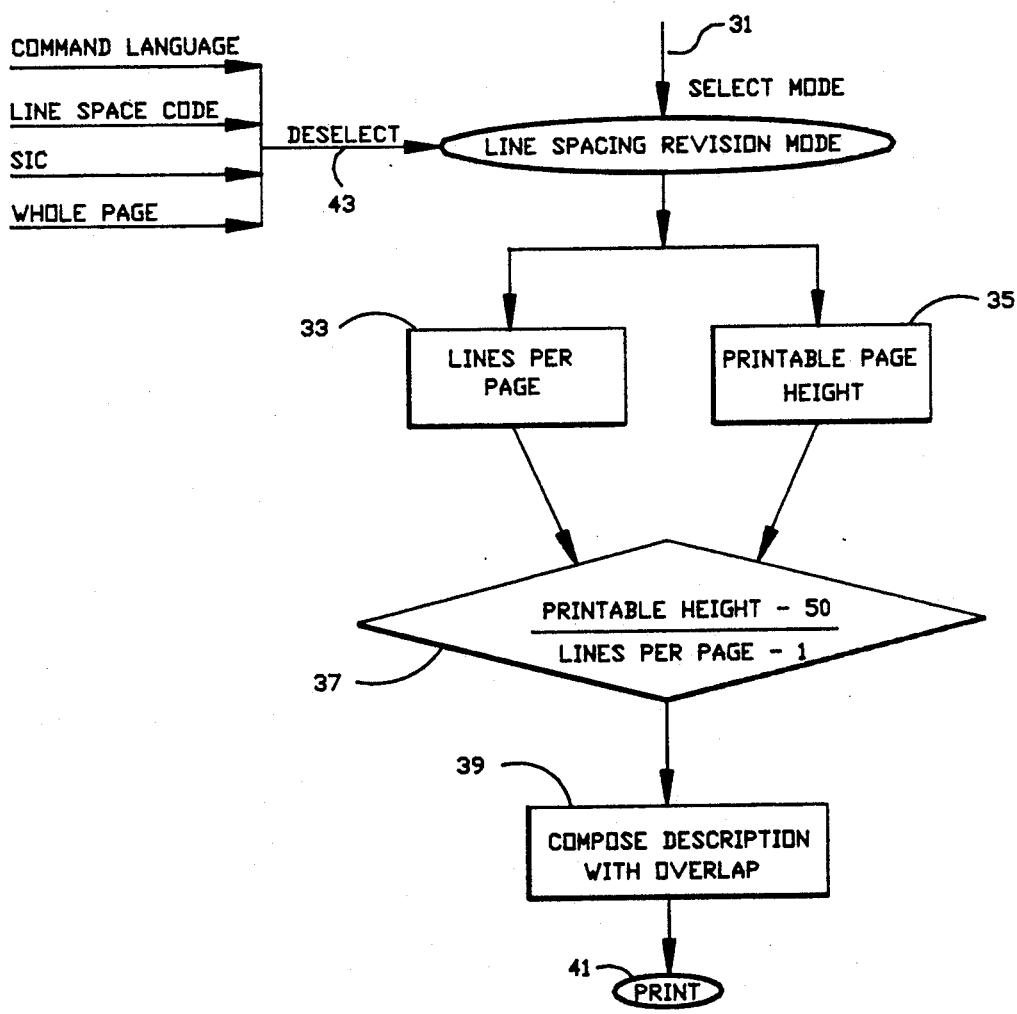
FIG. 3 illustrates the operating sequence performed electronically to implement this invention.

The operating sequence conducted electronically by microprocessor 7 is shown in FIG. 3. If the data defines the line spacing, this invention is not normally employed, and in the preferred embodiment data defining line spacing deactivates selection of this mode. When the data does not define the line spacing, the line spacing is defined as the factory default line spacing of 6 lines per inch. The alternative default line spacing of 8 lines per inch is set by code received on port 3. The number of lines per printable page, which is the number of contiguous lines each occupying the full 50 pels character box height, is defined to the microprocessor as a stored value related to the physical page size and orientation selected by the operator at control panel 13. Data for printing is received by microprocessor 7 from port 3.

FIG. 3 describes the operation when the line spacing revision mode is operative, shown illustratively by select mode signal 31, which is under control of microprocessor 7 responding to control panel 13 and other signals as will be described. In operation 33, microprocessor 7 determines the lines per page by multiplying the height of current page size entered from the control panel 13 by the current default line spacing. In operation 35, microprocessor 7 determines the printable page height by reading the stored value from permanent memory 10 unique to the document and orientation last input from the control panel 13. In operation 37, microprocessor 7 computes the line spacing by subtracting 50 from the height of the printable area and dividing that by the lines per page of data less 1. In operation 39, the mapped page description is composed using results of operation 37. Printing is then conducted on the basis of the description composed in operation 37, indicated by print function 41.

When the printer is changed to a mode to respond to printer command language or PCL, the line adjustment mode is deselected, shown as input 43. Microprocessor 7 responds to that new mode being active by using 6 lines per inch as the spacing. Also, in that mode top and bottom margins of 3 full lines are assumed and microprocessor 7 responds to that mode being active by using a printable page length as the defined page length of the physical page specified from control panel 13, or from the data less six lines. The operator may select 66 lines per page from panel 13, which is responded to by microprocessor 7 setting the line spacing to a fixed, predetermined distance which assures that 66 lines will fit in the space of 60 lines.

The revised line spacing mode is deselected when the printer is in a mode specific to defining the whole, physical page, sometimes known as the whole page coordinate system. Similarly, except for a change in default line spacing, microprocessor 7 responds to all subsequent line spacing commands, including line spacing for graphic data, to override the line revision mode of this invention. Commands in data which set line spacing, known as SIC or set initial conditions commands, cancel the revise line spacing mode, and the mode stays deselected until called for by selection of the mode from control panel 13.

Although in the implementation described the specification of lines per page comes from the operator input of page size, this invention may have particular value where that information is derived from the data received. Thus, data would be read ahead and codes of line ending significance counted between codes of page ending significance. The total would constitute the specified lines per page used in accordance with this invention. Further composition in accordance with this invention would invariably fit the lines in the printable area, completely without operator intervention. Also, with the capability of this invention available, it would readily possible to add code to allow incoming data to select this mode, so that writers of data can add to the data code defining both selecting the mode of this invention and defining the lines per page. Other variations of the implementations disclosed will be apparent, and future enhancements can be anticipated, all within the spirit and scope of this invention.

We claim:

1. A controller for a page printer which composes mapped descriptions based on fixed-height character boxes of unique pel information for each pel position in an area printable by said printer comprising means to receive text data in a form defining lines, data processing apparatus: to determine a specified number of lines per page of a page of text to be printed; to determine at least approximately a revised line spacing constituting said lines per page less one divided into the height of said printable area less one full said character box height, and to compose a mapped description of all of said page of text with lines separated at least approximately by said revised line spacing, and print control apparatus to control printing by said printer by said composed mapped description with lines spaced along the height of said page.

2. The controller as in claim 1 also comprising a first mode control apparatus to select one mode in which said text data is composed to a mapped description with line separation defined without reference to said printable area and to select a second mode in which revised line spacing is composed as described in claim 1.

3. The controller as in claim 2 also comprising data processing apparatus to recognize said data as a line spacing command and to deselect said second mode in response to said recognition of said line spacing command.

4. The controller as in claim 1 also comprising data processing apparatus to recognize said data as a line spacing command and to deselect said second mode in response to said recognition of said line spacing command.

5. The controller as in claim 4 in which said data processing apparatus determines said lines per page by multiplying the physical size of said page by the default line spacing.

6. The controller as in claim 1 in which said data processing apparatus determines said lines per page by multiplying the physical size of said page by the default line spacing.

7. The controller as in claim 2 in which said data processing apparatus determines said lines per page by multiplying the physical size of said page by the default line spacing.

8. The controller as in claim 3 in which said data processing apparatus determines said lines per page by multiplying the physical size of said page by the default line spacing.

9. A page printer comprising printing apparatus to print on paper or other substrate by potentially marking each pel of a contiguous area forming a page, an input port to receive data defining information to be printed, a controller to compose a mapped description based on fixed height character boxes of unique information for each said pel of said page area, data processing apparatus: to determine a specified number of lines per page of text; to determine at least approximately a revised line spacing constituting the ratio of said lines per page less one divided into the height of said page area less one full said character box height, and to compose a mapped description of all of said page area with lines separated at least approximately by said revised line spacing, and apparatus to control said printing apparatus by said composed mapped description with lines spaced along the height of said page.

10. The printer as in claim 9 also comprising a first mode control apparatus to select one mode in which said text data is composed to a mapped description with line separation defined without reference to said page area and to select a second mode in which revised line spacing is composed as described in claim 5.

11. The controller as in claim 10 also comprising data processing apparatus to recognize said data as a line spacing command and to deselect said second mode in response to said recognition of said line spacing command.

12. The controller as in claim 9 also comprising data processing apparatus to recognize said data as a line spacing command and to deselect said second mode in response to said recognition of said line spacing command.

13. The page printer as in claim 12 in which said data processing apparatus determines said lines per page by multiplying the physical size of said page by the default line spacing.

14. The page printer as in claim 9 in which said data processing apparatus determines said lines per page by multiplying the physical size of said page by the default line spacing.

15. The page printer as in claim 10 in which said data processing apparatus determines said lines per page by multiplying the physical size of said page by the default line spacing.

16. The page printer as in claim 11 in which said data processing apparatus determines said lines per page by multiplying the physical size of said page by the default line spacing.

* * * * *